US00RE35373E

United States Patent [19]

Kilgrow et al.

[11] E Patent Number: Re. 35,373

[45] Reissued Date of Patent: Nov. 5, 1996

[54] VEHICLE TIRE DEFLATOR

[76] Inventors: Donald C. Kilgrow, 164 W. 100 South, P.O. Box 844, Monticello, Utah 84535; Melvin H. Pedersen, 161 E. 175 South, North Salt Lake City, Utah 84054

[21] Appl. No.: 418,804

[22] Filed: Apr. 7, 1995

Related U.S. Patent Documents

Reissue of:

[64] Patent No.: 5,253,950
Issued: Oct. 19, 1993
Appl. No.: 859,071
Filed: Mar. 27, 1992

[51] Int. Cl.[6] ..... E01F 13/00

[52] U.S. Cl. ..... 404/6; 256/1

[58] Field of Search ..... 404/6, 9; 256/1

[56] References Cited

U.S. PATENT DOCUMENTS 4,995,756 2/1991 Kilgrow et al. ..... 404/6

*Primary Examiner*—William P. Neuder
*Attorney, Agent, or Firm*—A. John Pate; Berne S. Broadbent; Gary D. E. Pierce

[57] ABSTRACT

An improved vehicle tire deflator that is a foldable and can be deployed by pushing it or pulling it to an extended attitude across at least one full traffic lane. The deflator includes a plurality of rocker arms that are each pivotally coupled to base supports, forming a frame that is collapsible and when extended, includes a stop arrangement for holding the rocker arms apart. The rocker arms each include a plurality of actuators that incorporate spaced center holed and countersunk spike base bosses, each boss to accommodate an end of a hollow spike and attached resilient grommet fitted therein. When a tire rolls onto a rocker arm actuator, that rocker arm is canted towards the rolling tire tread, directing a hollow spike sharp and into the tire tread to lodge therein as the tire continues to roll over the actuator, the resilient grommet absorbing forces as are exerted by the tire rolling over the hollow spike pointed end and the hollow spike is pulled out from its spike base boss seat and travels fully into the tire, allowing air from within that tire to vent therethrough. Alternatively, for penetrating a steel belted fire, or the like, an insert that is formed of a hard steel, or the like, and has a pointed end can be fitted-longitudinally into and maintained in which hollow spike, the insert pointed end to extend beyond the hollow spike pointed end to first contact the tread of a tire rolling thereover.

40 Claims, 8 Drawing Sheets

VEHICLE TIRE DEFLATOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention related to devices for use by police, military or the like, to provide a controlled deflation of the pneumatic tires of a vehicle driven thereover.

2. Prior Art

From time to time law enforcement officials find it necessary to stop a vehicle being operated by a person who has refused an order to stop. Portable barricades including positioning vehicles across a roadway, have often been used to stop a fleeing vehicle. Where, for example the barricades have been removable, such as saw horses, such have often not been sufficient to discourage a vehicle from running through the barrier, potentially resulting in vehicle damage and injury. Of recent time, devices have been developed for deflating the tires of such fleeing vehicle.

An earlier U.S. Patent of two of the present invention, U.S. Pat. No. 4,995,756, is such a tire deflation device. This device consists of a collapsible and extendible frame that includes one or more rocker arms carrying hollow spikes, with actuators attached to which rocker arms to pivot the rocker arms so as to position the spikes to enter a tire rolling thereover, to pull the spikes from the rocker arms that enter the tires. The U.S. Pat. No. 4,995,756 was deemed to be unique over earlier U.S. Pat. Nos. 1,276,100; 2,912,229; 3,652,059; and 4,382,714, and foreign patents, 593,355, Fed. Rep. of Germany and 2,032,983, United Kingdom, that show different arrangements of frames, pins and spikes, as pneumatic tire deflators, and the like. None of which earlier devices show the particular collapsing frame structure and components thereof. Nor do any shown the resiliently mounted removable and replaceable hollow spikes of the invention.

The present invention is an improvement over which U.S. Pat. No. 4,995,756. Specifically, the present improvement is in the foldable and extendable frame with stops and ramp arrangements, rocker arms spike mounts, and cushioning sleeve and spikes for arrangement in which spike mounts, and includes a unique cushioning sleeve and spike mounting tool.

SUMMARY OF THE INVENTION

It is a principal object of the present invention in a vehicle tire deflator to provide a frame that is easily folded and can be conveniently unfolded and extended to be slid by an operator from one side of a traffic lane or roadway across at least that traffic lane without exposing that operator to danger from on coming traffic.

Another object of the present invention is to provide an improved spike mount for the frame rocker arms where the forces exerted by a vehicle tire rolling onto a hollow spike of the invention will not deform the spike seat.

Another object of the present invention is to provide a hollow spike with cushioning sleeve arrangement for providing a resilient spike to rocker arm mounting.

Another object of the present invention is to provide a spike that is capable of piercing a steel belted tire.

Still another object of the present invention is to provide tooling for easily and safely installing the individual hollow spikes with cushioning sleeve collars into the rocker arm spike seats.

Still another object of the present invention is to provide an inexpensive method to produce an easy to use device for safely deflating the tires of a vehicle that travels thereover.

The invention is in a vehicle tire deflator consisting of a frame that includes a base support with articulated arm sections that are arranged to fold together, and, when extended, will have a length that is sufficient to at least reach across a traffic lane. Ramp and stop arrangements are provided on each of the base and arm sections that overlay one another providing for both locking to allow the extended frame to be pushed across the traffic lane and also to provide for maintaining which arm sections off of the pavement as the frame is pushed or pulled into an extended attitude across the traffic lane.

The articulated arm sections consist of rocker arms that are pivot mounted to the base supports to rock thereon on depression of actuator arms extending therefrom. The rocker arms releasably mount or seat hollow spikes to extend therefrom. For which spike seat, spike base bosses that extend from the rocker arms are drilled to the spike diameter and are then counter-sunk to the form of a resilient cushioning sleeve that is fitted as a collar onto which spike. The cushioning sleeve absorbs energy of a tire rolling onto the spike that would otherwise cause the spike seated end to move, elongating that spike seat end hole. The cushioning sleeve allows that tire force to move the spike in the direction of tire travel as the spike is directed into the tire, allowing the spike to pivot without elongating the spike seat.

When the pneumatic tire rolls over the spike, it enters the tire and is pulled from its rocker arm seat. The tire, as it continues to roll pushes the spike fully into the tire to the spike base end. The hollow spike provides a passage for air escaping from the tire, creating a controlled tire deflation, that allows the vehicle operator to safely stop the vehicle as the tires go flat. For a puncturing a steel belted tire, the spike of the invention preferably includes a pointed insert that is a corrugated section arranged to loosely fit axially therein. The insert point is fitted to extend beyond the pointed end of which hollow spike, and the base thereof is notched centrally forming end sections that are bent oppositely into feet for extending just beyond the hollow spike base edge.

Additionally, the invention includes a tool having a ball end with one or more recesses wherein a hollow spike is fitted, sharp end first, and a cushioning sleeve is fitted over a flat end of which spike. Which tool also includes a straight shaft for fitting over the spike sharp end, resting on the cushioning sleeve top surface, for seating the spike flat end and cushioning sleeve in the rocker arm spike seat.

THE DRAWINGS

A further understanding of the invention and its advantages will be apparent from the following detailed description taken in conjunction with the accompanying drawings in which.

Figure 13:
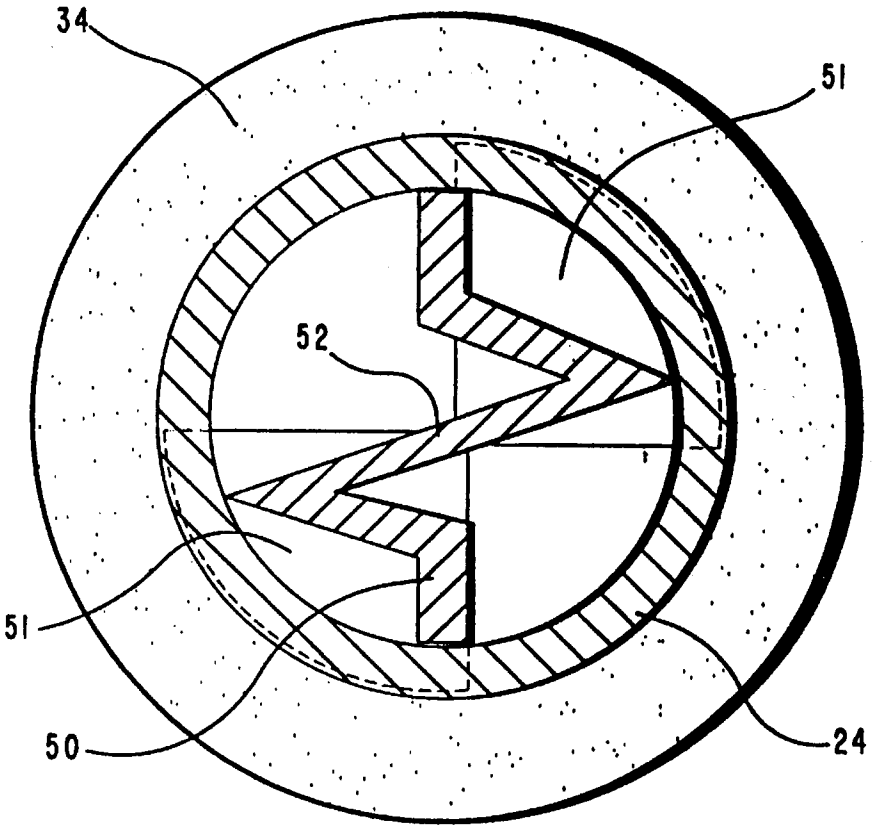
Figure 12:
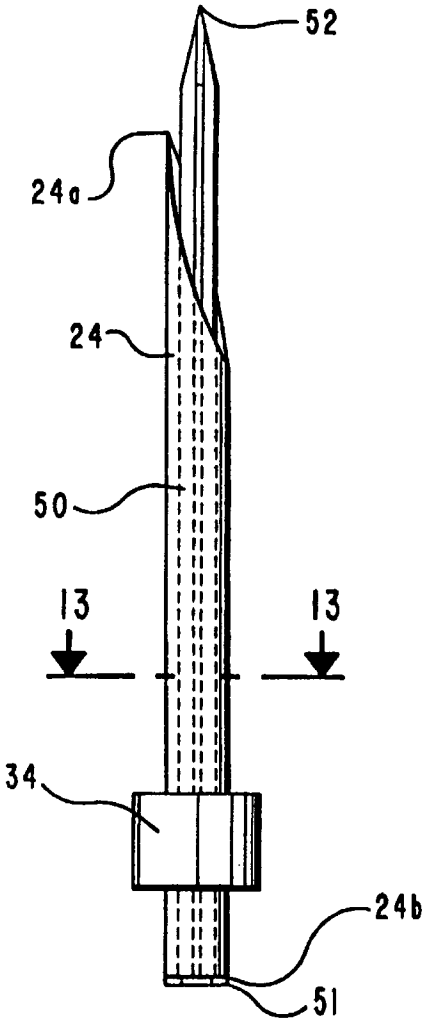

FIG. 12 is an enlarged side elevation view of a hollow spike of the invention that is shown as including an insert fitted therein having one pointed end that extends above the hollow spike pointed end and with the opposite end shown slotted and the formed end sections shown bent oppositely and fight angles across the hollow spike flat end; and FIG. 13 is sectional view taken along the line 13—13 of FIG. 12 showing the insert as formed from a corrugated section extending across the hollow spike center opening.

DETAILED DESCRIPTION

Figure 5:
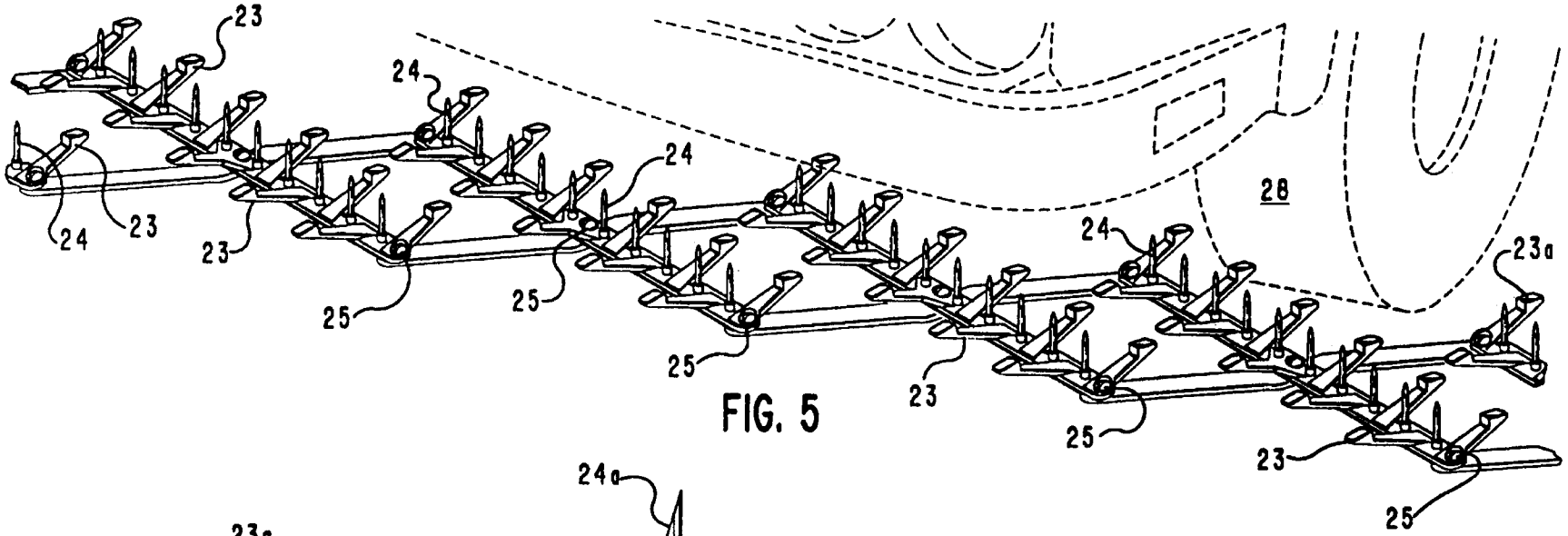
FIG. 5 is a view like that of FIG. 1, showing the improved vehicle tire deflator extended across a traffic lane, showing a vehicle tire, in broken lines, about to roll over the tire deflator.

The present invention is an improvement over U.S. Pat. No. 4,995,756, in a Vehicle Tire Deflator issued to two of the present inventors. The present invention, as shown best in FIGS. 1, 3, 5, 8 and 9, like the U.S. Pat. No. 4,995,756, is in a vehicle tire deflator 20, hereinafter referred to as deflator. The deflator 20 includes a plurality of base supports 21, a plurality of rocker arms 22 extending across which base supports, with a number of rocker arm actuators 23 extending from opposite sides of which rocker arms to point towards an oncoming vehicle when the deflator 20 is extended across a traffic lane, as shown in FIG. 5. The rocker arms 22, in turn, support a plurality of hollow spikes 24 projecting from the top surfaces thereof. Which hollow spikes for puncturing a standard tire can be hollow tubes only having sharp ends 24a only, or, as shown in FIGS. 12 and 13, can further include an insert 50 for puncturing a steel belted tire, or the like. Insert 50 preferably consists of a section of metal, such as a hard steel, as for example a 4140 steel, tungsten steel, or like hard material. Which section of hard material is bent serpentine to have a corrugated appearance, or has been otherwise formed to resist bending, such as into a star configuration, or the like. An insert is thereby provided that will resist bending without closing of the passage through the hollow spike wherein it is fitted, and which insert end is formed into a sharp end 52. The insert 50 sharp end 52, when the insert is fitted in the hollow spike 24, as shown in FIG. 12, will extend beyond the top end of which spike. To maintain the insert 50 in the hollow spike 24, the insert bottom end is centrally longitudinally slotted and the insert end sections so formed are bent oppositely, at right angles to the insert longitudinal axis, into feet 51 that extend across the hollow spike bottom end 24b.

Figure 1:
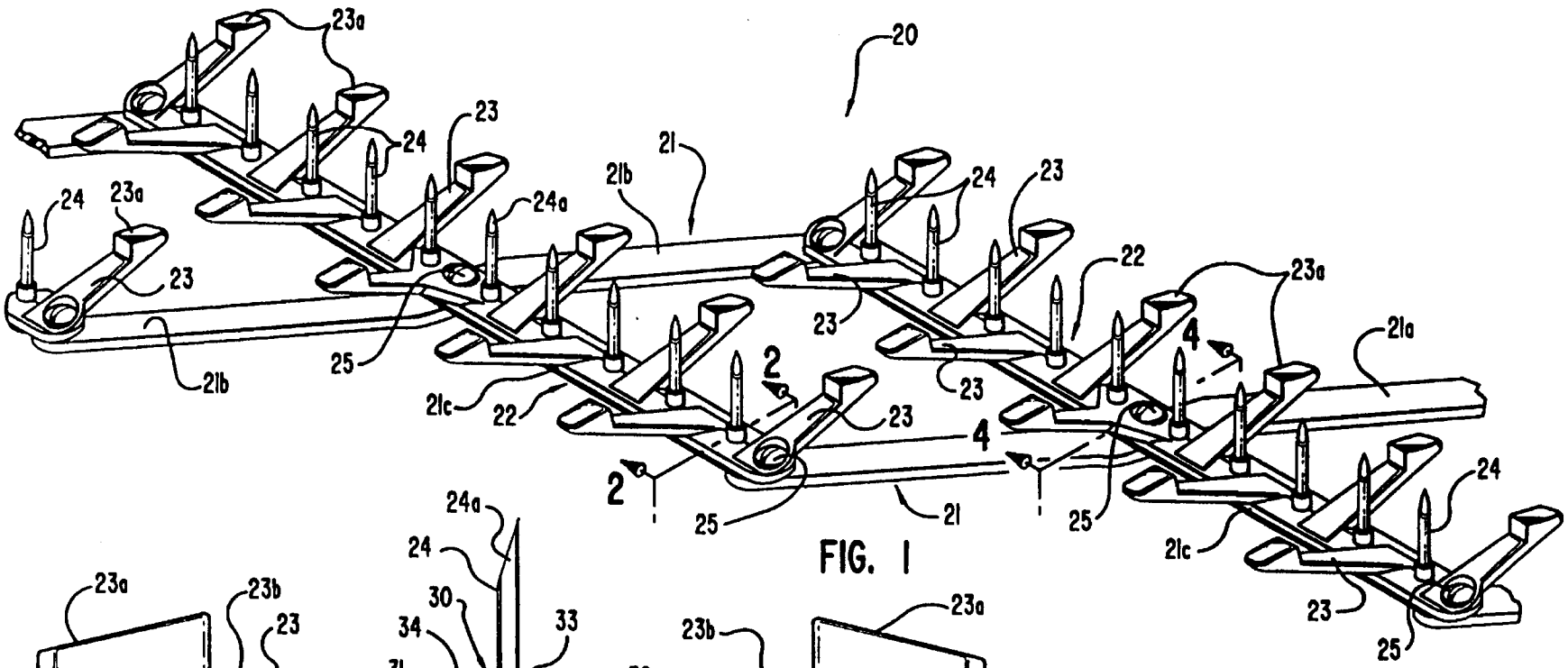
FIG. 1 is a perspective view of the improved vehicle tire deflator of the present invention, shown extended.
Figures 8, 11:
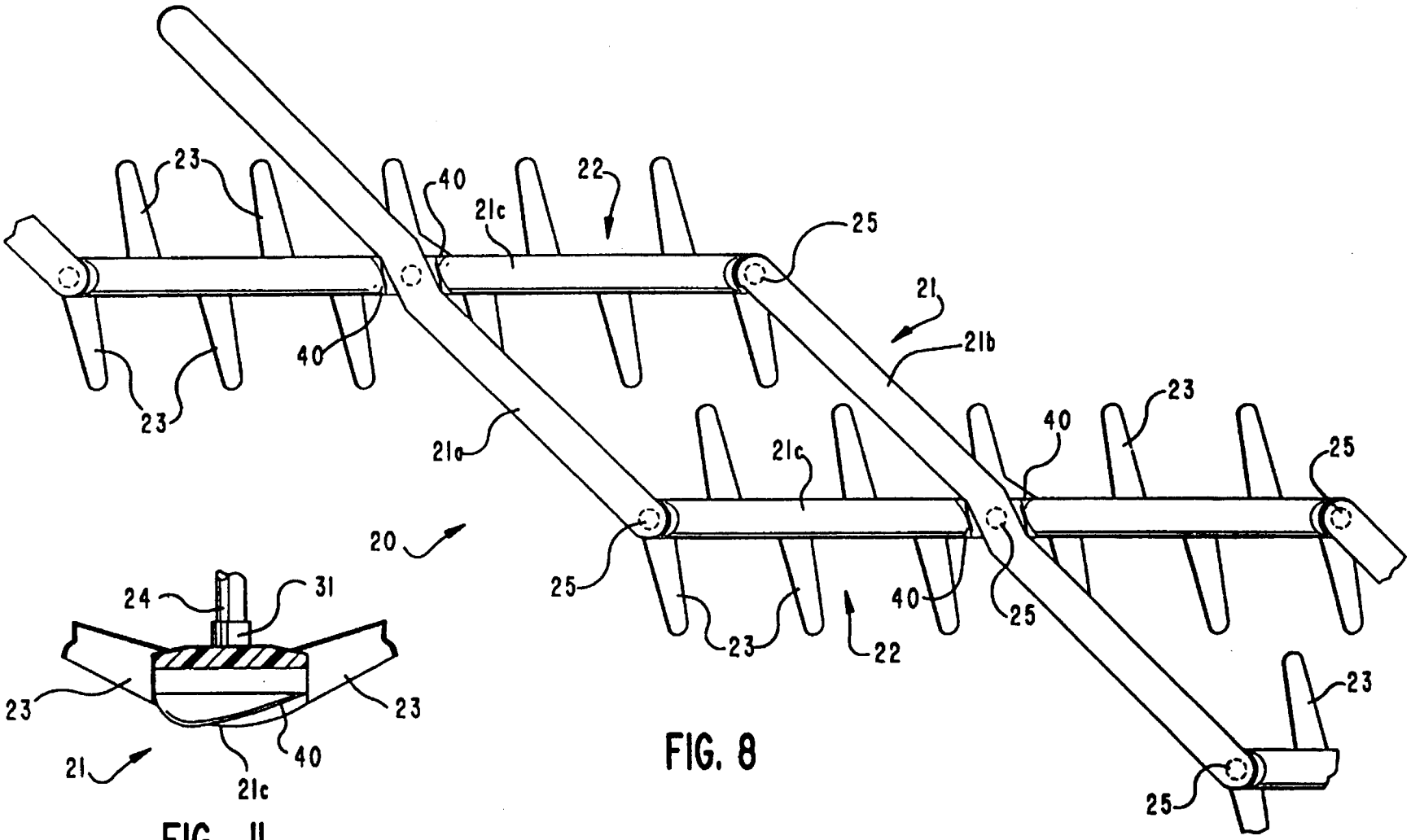
FIG. 8 is a bottom plan view of a broken away portion of a base support of the erected tire deflator of FIG. 5.
FIG. 11 is a sectional view taken along the line 11—11 of FIG. 8, showing, turned fight side up, the rocker arm that mounts oppositely facing radial lifting ramps.

The base supports 21, as shown best in FIG. 1, 5 and 8, are of identical in construction and are arranged to be parallel to one another. Each base support includes a pair of legs 21a and 21b that are pivotally connected at their ends by a pivot 25 to diagonal portions 21c Which base supports legs and diagonal portions are preferably formed as individual pieces manufactured from plastic, wood, or the like material.

Figure 3:
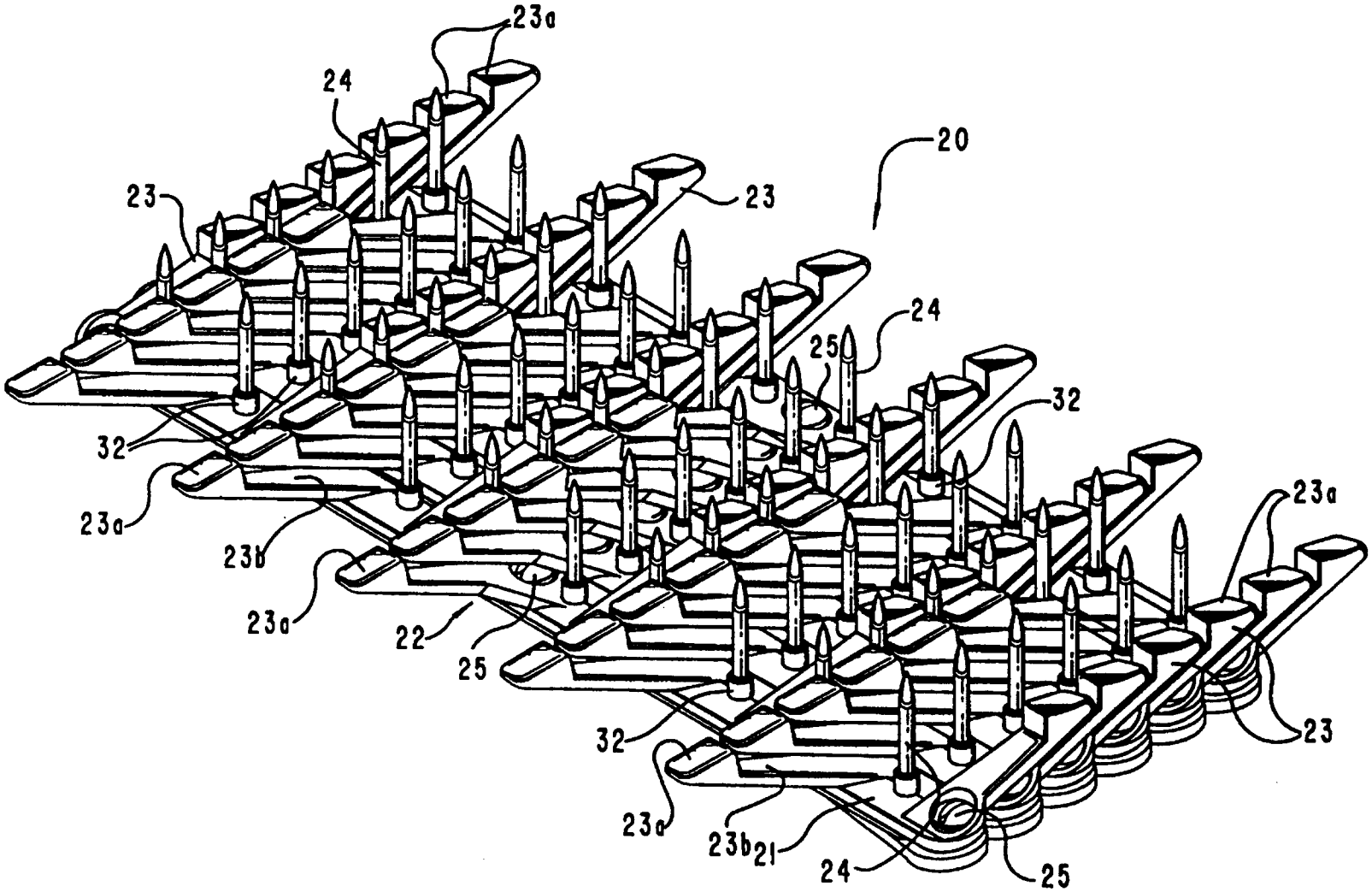
FIG. 3 is a view like that of FIG. 1 only showing the improved vehicle tire deflator folded or closed for storage or transport.
Figure 4:
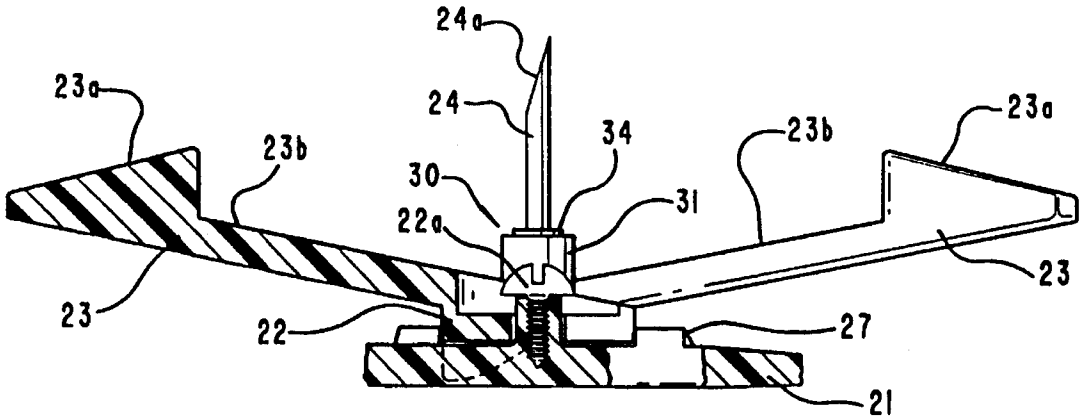
FIG. 4 is a side elevation sectional view taken along the line 4—4 of FIG. 1.
Figure 10:
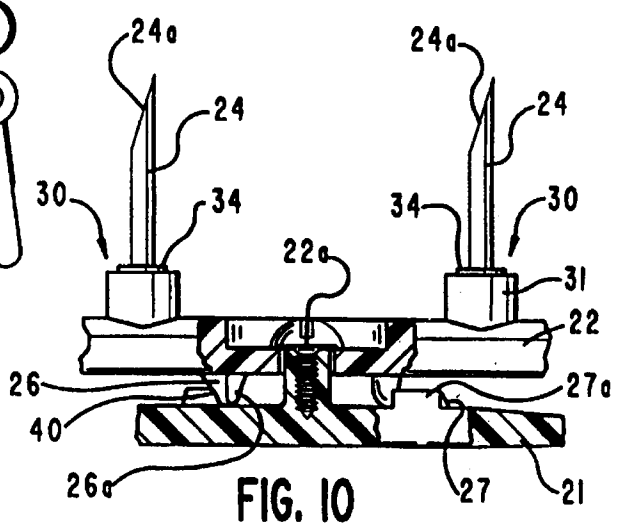
FIG. 10 is a side elevation sectional view taken along the line 10—10 of FIG. 9.

The rocker arms 22 are fitted onto to overlay the diagonal portions 21c of the base support 21, and are secured thereto as with screws 22a, shown in FIGS. 4 and 10, and with the pivots 25 that extend through which stack of rocker arms and diagonal portions. The base supports 21 thereby provide a frame that mounts the rocker arms 22 and rocker arm actuators 23, and can be collapsed to a closed attitude, as shown best in FIGS. 3 and 9, and opened to an extended or deployed attitude, as shown in FIGS. 1, 5 and 8. With the same interconnection arrangement and pattern of connections a number of base supports 21 and rocker arms 22 can be formed into an assembly of any desired length, to be folded to a closed attitude or stretched, as set out above, to where the spikes 24 will be essentially aligned such that a tire will roll over a number of which spikes, as shown in FIG. 5.

Position locks, shown as angle stops 26 and 27, extend outwardly from the opposing top and bottom surfaces of the base supports diagonal portions 21c and the rocker arms 22, respectively. The angled stops have opposing faces 26a and 27a that contact and prevent further rotation past a limit point by the rocker arms 22 relative to the base support diagonal portions 21c. The angled stops restrain the deflator 20 from opening or being deployed beyond a point where rocking of the rocker arm actuators 23 mounted to adjacent rocker arms 22 will interfere with one another.

The pivot connections 25 are loose fitting enough that they not only permit pivoting of the base supports 21 and rocker arms 22 relative to one another, but they also permit the rocker arms to rock back and forth with respect to the base supports while normally holding the rocker arms in a centered position. Which rocker arms 22 rocking back and forth occurs when a vehicle tire as illustrated in FIG. 5, rolls onto a shoulder 23a of a rocker arm actuator 23, rocking the rocker arm 22 towards the road surface and tilting the spike 24 to where its pointed end 24a will point toward the tire 28 tread. Which rocker arm actuator shoulders 23a are arranged for providing a gripping by the tread of tire 28 to provide a positive pivoting of which rocker arm as the tire moves thereon, directing the spike 24 into the tire.

Figure 2:
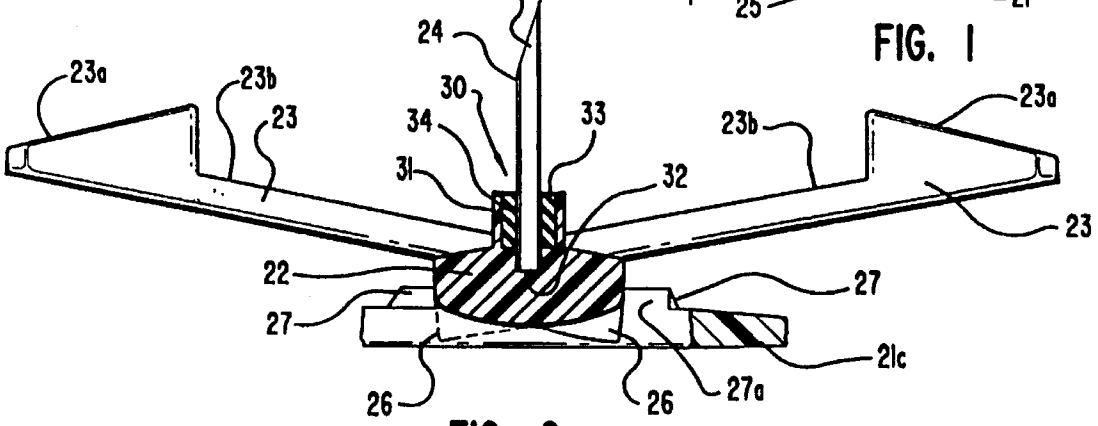
FIG. 2 is a side elevation sectional view taken along the line 2—2 of FIG. 1.

The spikes 24 are preferably hollow metal tubes that each have one end 24a sharpened into a point, with the other tube end 24b left flat, as shown best in FIGS. 2, 4, 6A, 6B, and 10. The straight open passage through which spike, when it is embedded in tire 28, to vent air from that tire, providing a controlled deflation to where a vehicle operator can safely stop his vehicle prior to where the tire is fully deflated. The spikes 24 can be of any convenient size, and could even be hypodermic needles, or the like, within the scope of this disclosure. Each spike 24, with or without the insert 50 fitted therein, is arranged for seating in a spike recess or seat 30 that are formed at spaced intervals, as shown in FIG. 2, in the top surface of the rocker arms 22.

Each spike recess or seat 30, shown best in FIG. 2, is drilled or otherwise formed into a spike base boss 31 that is molded on and extends upwardly from the rocker arm 22. Which drilling produces a recess or hole 32 having the diameter of the spike 24 at its flat end 24b. With the insert 50 fitted axially in the hollow spike, the insert feet rest on the floor of which recess or hole 32 maintaining which insert in place until it is removed along with the hollow spike 24, as set out herein below. The hole 32, at the surface of the spike base boss 31, is countersunk to a greater diameter cushioning sleeve seat 33. The countersunk cushioning sleeve seat 33 is for accommodating a cushioning sleeve 34 snugly fitted therein that is arranged as a collar spike 24. A mounting of cushioning sleeve 34 onto spike 24 is illustrated in FIGS. 6A and 6B.

Figure 6A:
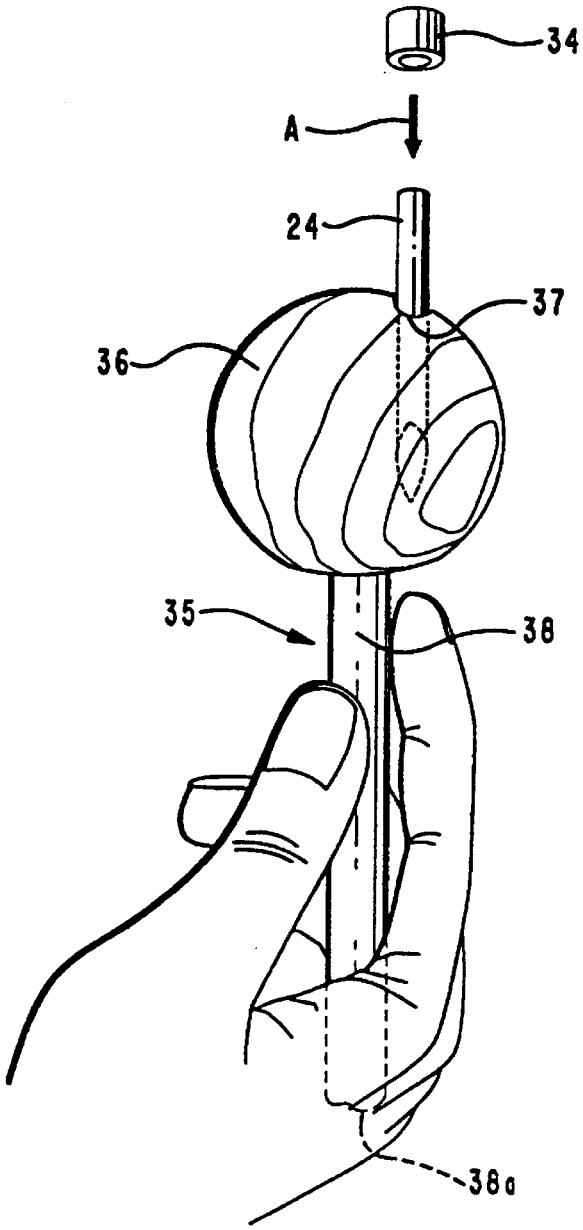
FIG. 6A is a side elevation view of a cushioning sleeve assembly and compression insert tool, showing a ball end up with a hollow spike fitted, pointed end first, into a hole in which ball end, and showing a cushioning sleeve aligned for installation as a collar over which hollow spike.
Figure 6B:
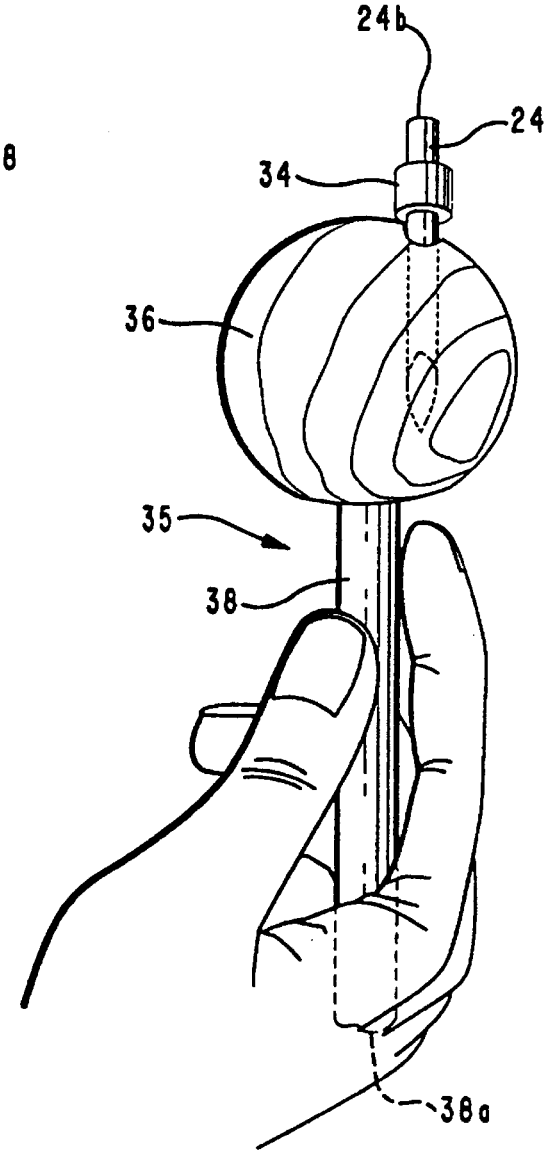
FIG. 6B is a view like that of FIG. 6A only showing the cushioning sleeve as having been axially installed onto the pointed spike.

FIGS. 6A and 6B show a combination cushioning sleeve assembly and compression insert tool 35 of the invention, hereinafter referred to as tool. The tool 35 includes a cushioning sleeve assembly knob 36, that has one or more spike holes 37 formed therein, and is mounted to the end of a cushioning sleeve compression and insertion shaft 38, that is a straight rod that is holed longitudinally to accommodate a hollow spike 24 fitted therein. For mounting the cushioning sleeve 34 onto which spike 24, the spike is fitted, sharp end 24a first, into spike hole 37 in the knob 36, and the cushioning sleeve is fitted over the spike flat end 24b, shown by Arrow A in FIG. 6A. Which cushioning sleeve 34 is manually pressed onto which spike flat end 24b and slid down the spike 24, exposing approximately one half (½) inch of the spike flat end portion, as shown in FIG. 6B. The spike and cushioning sleeve can then be removed from spike hole 37 and fitted into the open end 38a of the cushioning sleeve compression and insertion shaft 38 for mounting in the spike recess or seat 30.

Figure 7:
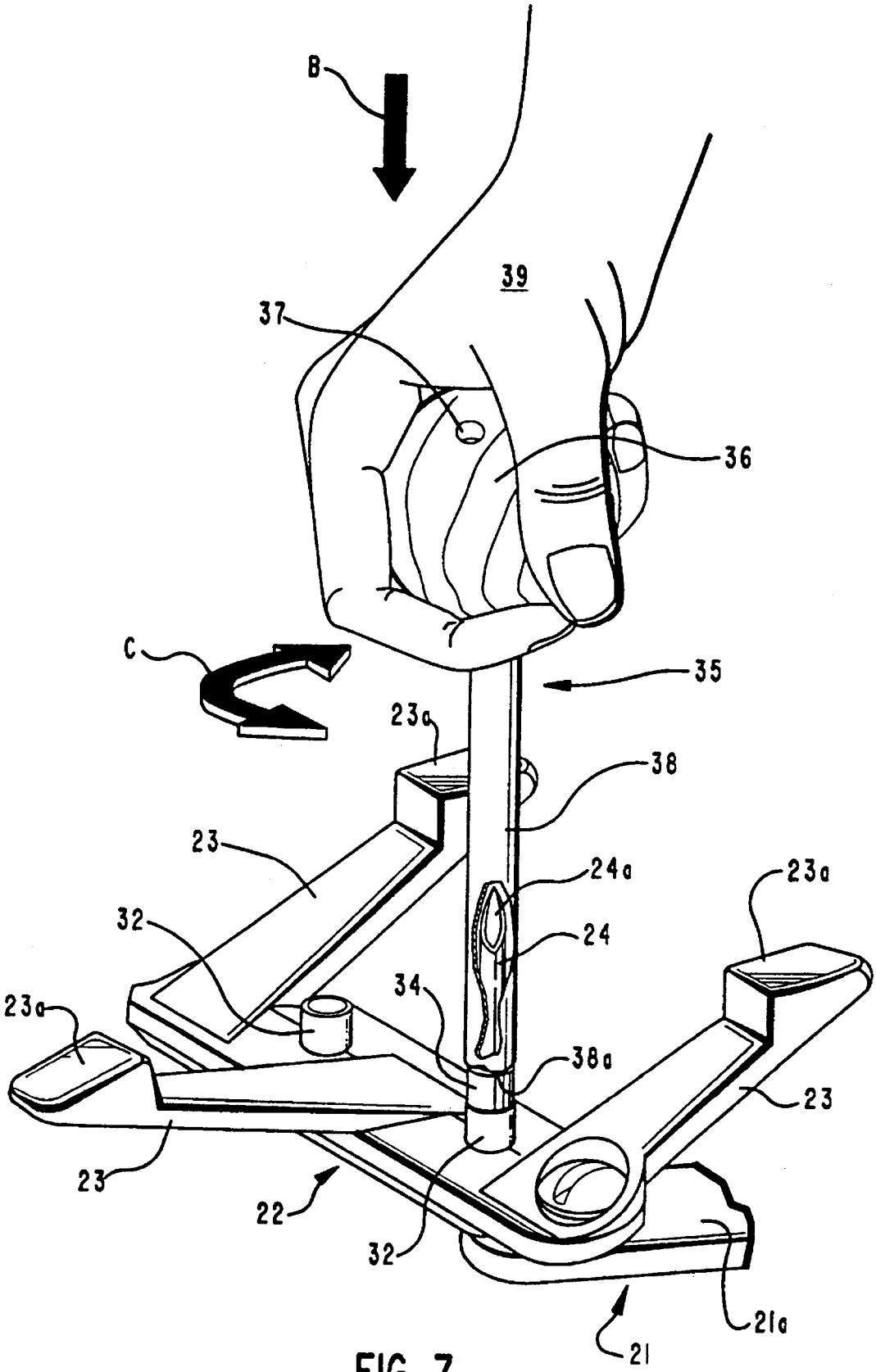
FIG. 7 is a profile perspective view of the cushioning sleeve assembly and compression insert tool of FIG. 6A, showing the ball end of which tool being manually manipulated so as to fit a hollow spike, shown in a broken away portion of a tube portion of which tool, with a cushioning sleeve collar into a spike seat formed into a rocker arm spike base boss of which tire deflator.

Shown in FIG. 7, the cushioning sleeve compression and insertion shaft 38 of the tool 35 is broken away, adjacent to its open end, to expose a hollow spike 24 maintained therein, with a cushioning sleeve 34 shown mounted to the hollow spike as a collar. Which cushioning sleeve is positioned below the end 38a of the cushioning sleeve compression and insertion shaft 38, and above the cushioning sleeve seat 33 in the spike base boss 32, with the hollow spike flat end 24b shown aligned to fit into the spike hole 32. So arranged, FIG. 7 shows an operators hand 39 closed around the cushioning sleeve assembly knob 36. That operator, through hand 39, to apply both a downward or compressive pressure, illustrated by Arrow B, against the cushioning sleeve 34, and turns which knob, illustrated as Arrow C, to urge the cushioning sleeve into the cushioning sleeve seat 33 of the spike base boss 31. In which cushioning sleeve seating, the spike flat end 24b travels into the seat recess or hole 32, fully seating which spike 24 in the rocker arm 22 spike recess or seat 30, as shown best in FIG. 2.

Shown in FIG. 5, a vehicle tire 28 engages one or more rocker arm actuator shoulders 23a, depressing that shoulder into the ground and rolling over a ramp 23b of which rocker arm actuator. The rocker arm actuator rotation, in turn, twists the rocker arm 22 wherefrom it extends, pointing the sharp ends 24a of the spikes seated in spike recesses or seats 30 towards the tread of which rolling tire 28. Therefore, as the tire 28 rolls over the rocker arm actuator shoulder 23a and along ramp 23b, the spike 24 sharp end 24a engages and is driven into the tire tread, traveling fully therein as the tire passes over the spike seat 30. Continued tire rolling thereafter pulls the spike 24 out of the spike seat 30 and releases the rocker arm actuator 23 as the tire rolls off the spike base boss 31. Where the hollow spike 24 further includes the insert 50 fitted therein as for puncturing a steel belted tire, as shown in FIGS. 12 and 13, that insert 50 travels with the hollow spike 24. With continued tire 28 turning, however, the insert that is held within the hollow spike by its feet that extend across the hollow spike base end 24b, tends to slide out of the hollow spike, fully opening the longitudinal passage therethrough.

As set out above, twisting of the rocker arm actuator 23 points or directs the spike 24 pointed end 24a into the tread of tire 28, with the tire pulling the spike out of the spike seat 30 as it rolls over the spike base boss 31. The weight and momentum of which tire rolling over the spike 24, however, produces stresses that are transmitted through spike that tend to move the spike flat end 24b, deforming and damaging the spike seat 30, to where it may not accept another spike 24 fitted therein precluding a reuse of the deflator 20. Spike seat damage with use has particularly been a problem with the deflator of the U.S. Pat. No. 4,995,756. The deflator 20, however, with the utilization of cushioning sleeves 34 with spikes 24, as described, compensates for the forces exerted by a rolling tire on the seat, absorbing those forces and minimizing damage to which spike seat 30. The tire 28 rolling along the rocker arm actuator 23 and over the spike base boss 31, as described, tends to tilt the spike 24 and cushioning sleeve collar in the spike seat 30. The force of that tilting or pivoting of the spike end 24b in the recess or hole 32 is, however, transmitted to and absorbed in the cushioning sleeve 34, without deforming the walls of which spike seat 30. So arranged, the spike seats 30 can be easily refilled with spikes 24 and reused a number of times.

Shown best in FIGS. 8 10 and 11, a pair of radial lifting ramps 44) are provided that extend outwardly from the upper surface of the rocker arms 21, separated by the pivot 25, and sloping oppositely. The ramps 40, arranged on opposite sides of which pivot have their sloping surfaces positioned adjacent to the sides of the base support 22. The sloping surface of each radial lifting ramp 40 to engage the edge of the base support 22 as the rocker arm is pivoted across which base support, as when the deflator 20 is collapsed. The sliding of which base support along the radial lifting ramps 40 elevates the rocker arm 21 away from the base support. With deployment of the deflator 20 across a traffic lane, the radial lifting ramps slide across the base support, lowering the rocker arm 21 at the pivot 25 into engagement with the base support and into ground engagement.

Figure 9:
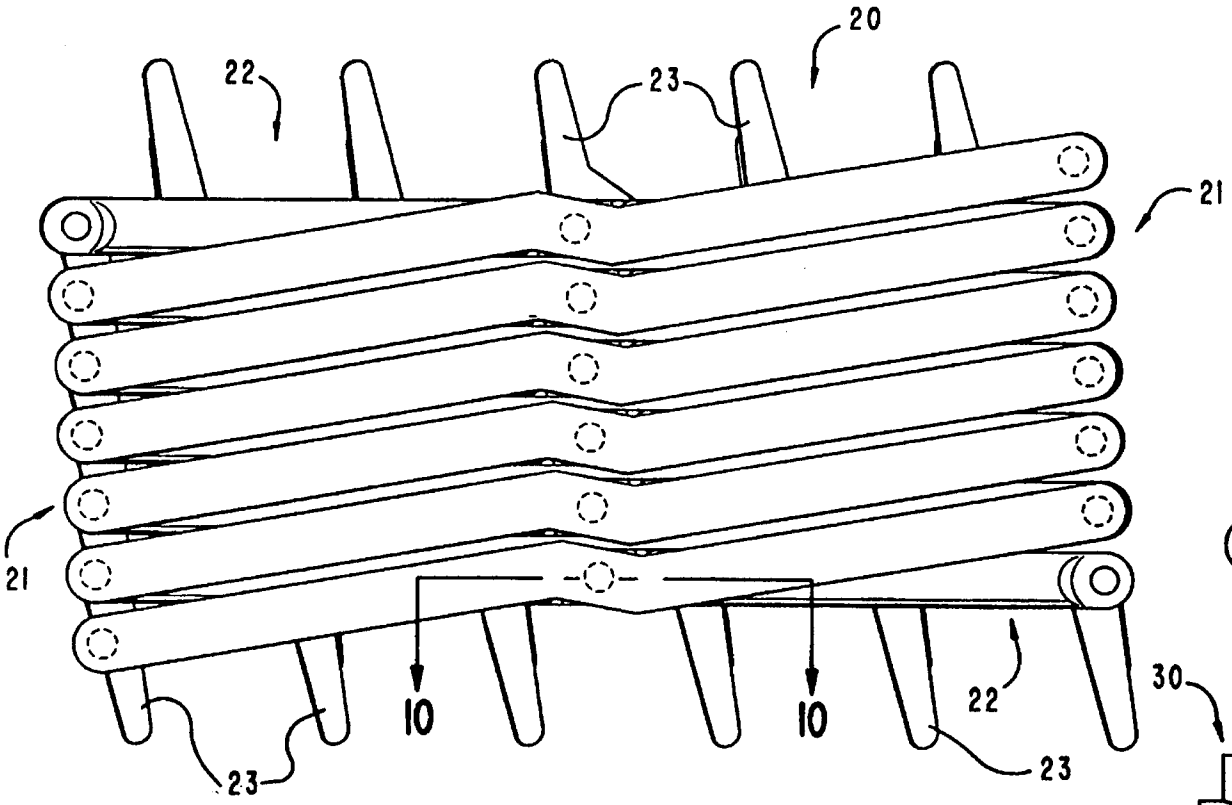
FIG. 9 is a bottom plan view of the collapsed or closed tire deflator of FIG. 3.

In practice, the deflator 20 is folded to a compact configuration, as illustrated in FIGS. 3 and 9, for storage and transport. When it is deemed necessary to use the deflator to stop a traveling vehicle, it is simply pushed or pulled across a traffic lane, the deflator extending from a closed to an open configuration, as illustrated in FIGS. 8 and 5. In that erection, the angle stops 26 and 27 move into engagement prohibiting the rocker arms 22 pivoting beyond their preferred spacing distance to where the rocker arm actuators 23 and adjacent rocker arms 21 would interfere with one another. Further to that erection, the radial lifting ramps 40 that have maintained the rocker arms 21 off the base support 22 in a collapsed state, slide back over the base support edges and lower each rocker arm 21 into street engagement when the deflator is fully extended. Each rocker ARM 21 is thereby maintained out of ground engagement, so as to minimize the surface area contacted, until the deflator 20 is erected, thereby facilitating its travel across a traffic lane.

With the deflator 20 positioned across a traffic lane, as illustrated in FIG. 5, the hollow spikes 24 extend upwardly from the rocker arms 22. The rocker arm or arms are each pivoted or twisted by travel downward to ground contact of a connected rocker arm actuator 23 as a vehicle tire rolls thereon. With rocker arm pivoting or twisting the pointed end 24a of which spike 24, and spike pointed end and insert 50 pointed end 52, as required, are directed into the vehicle tire. The spike and insert pointed ends penetrate and are driven into the tire as it rolls thereon. The force exerted by the weight and movement of which tire contacting the spike and insert pointed ends tending to pivot the spike 24 in its seat 30. Which force is absorbed by the cushioning sleeve 34 of the invention, before it creates a deformation of the seat recess or hole 32, allowing the spike seat 30 to be refilled with a new spike for reuse.

Within the scope of this disclosure, the deflator 20 can be fabricated to, when extended, be long enough to extend across one full traffic lane, but could be longer or shorter as required. Also, a number of deflators can be placed end to end to extend a greater distance, or a number of deflators can be arranged alongside one another to insure that more than one hollow spike will enter a tire rolling thereover, and, as required a hollow spike 24 with insert 50 can be utilized, as described, in place of the hollow spike 24 alone.

Herein has been shown and described a preferred form and arrangement of our invention in an improved vehicle tire deflator and components thereof. It should, however, be understood that the present disclosure is made by way of example only and that changes can be made thereto without departing from the subject matter coming within the scope of the following claims, and a reasonable equivalency thereof, which claims we regard as our invention.

We claim:

1. An improved vehicle tire deflator comprising, a plurality of rocker arm means; means for pivotally interconnecting said rocker arm means to allow for movement of said rocker arm means to a side-by-side folded relationship and to an end-to-end extended configuration; a plurality of spike boss means mounted at intervals along an upper surface of said rocker arm means; hollow spike seat means formed in each said spike boss means that each include a hole formed longitudinally into said spike boss means through the top thereof for receiving an end of a hollow spike, and which said hole is countersunk longitudinally, forming a cushioning sleeve seat for receiving a hollow spike cushioning sleeve snugly fitted therein; a straight hollow spike having a flat end for fitting into said spike boss means hole, and an opposite pointed end; a resilient cushioning sleeve for snugly fitting into said straight hollow spike; and rocker arms actuator means connected to extend outwardly and upwardly from said rocker arm means, each said rocker arm actuator means including a shoulder that is for first contact with a pneumatic tire rolling thereon.

2. An improved vehicle tire deflator as recited in claim 1, wherein the means for pivotally interconnecting said rocker arm means includes a plurality of base supports that are pivotally connected in parallel to said rocker arms; pivot means arranged between said rocker arm means and said base supports; and stop means adjacent to said pivot means for limiting rotation of said rocker arm means relative to said base supports.

3. An improved vehicle tire deflator as recited in claim 2, wherein the stop means is a pair of opposing stops one each formed to extend from, respectively, the bottom surface of the rocker arm means and the base support top, said stops positioned to engage and block further movement of said rocker arm means across the base support at a point where the actuator of one rocker arm means could engage an adjacent rocker arm means.

4. An improved vehicle tire deflator as recited in claim 1, further including a ramp means formed on the bottom surface of the rocker arm means, proximate to its pivotal coupling to the base support, consisting of a pair of oppositely facing upwardly sloping surfaces positioned on opposite sides of said pivot, said sloping surfaces, when said rocker arm means is pivoted, to engage opposite edges of a base support whereto said rocker arm means is pivotally connected, lifting said rocker arm means away from said base support.

5. An improved vehicle tire deflator as recited in claim 1, wherein the cushioning sleeve is manufactured from a resilient material.

6. An improved vehicle tire deflator as recited in claim 1, further including a combination cushioning sleeve assembly and compression insert tool including, means for mounting the cushioning sleeve as a collar onto the hollow spike, and means for mounting said hollow spike and cushioning sleeve into the cushioning sleeve seat.

7. An improved vehicle tire deflator as recited in claim 6, wherein the combination cushioning sleeve assembly and compression insert tool is a ball wherein at least one hole is formed to receive the hollow spike fitted therein and includes a tube extending from which ball to receive said hollow spike therein, the tube end to engage a top surface of said cushioning sleeve.

8. An improved vehicle tire deflator as recited in claim 1, wherein the deflator base supports, rocker arm means and actuators connected thereto are formed from a plastic material.

9. A hollow spike for mounting in a vehicle tire deflator comprising, a hollow tube having one end formed into a point end and an opposite flat end, said flat end for seating in a hollow spike seat means of a vehicle tire deflator; and an insert means for fitting longitudinally in said hollow spike that is formed of a section of a hard material, has a pointed end that extends beyond the hollow tube pointed end, and includes means for maintaining said insert means in said hollow spike until said hollow spike is removed from its mounting in the vehicle tire deflator.

10. A hollow spike as recited in claim 9, further including a cushioning sleeve means formed of a resilient material and for arrangement as a collar to the hollow spike.

11. A hollow spike as recited in claim 9, wherein the means for maintaining the insert means in the hollow spike includes centrally slotting the end of said insert at its end opposite to its pointed end, forming base sections of said insert means that are bent oppositely into feet that extend across a bottom end of said hollow spike.

12. A hollow spike as recited in claim 9, wherein the insert means section of hard material has at least one longitudinally bend formed therein from pointed to bottom ends.

13. A hollow spike as recited in claim 12, wherein the insert means has two opposite longitudinal bends formed therein forming a corrugated section that resists bending.

14. A hollow spike as recited in claim 9, wherein the insert means is formed from a section of hard steel.

*15. A deflator for tires, the deflator comprising:*

*a frame for supporting a plurality of spikes, the frame having an aperture extending a first depth and a first diameter;*

*a spike of the plurality of spikes positionable in the aperture the spike having a second diameter less than the first diameter;*

*a sleeve positionable around the spike to fit inside the aperture to resist distortion of the frame upon deflection of the spike.*

*16. The deflator of claim 15 wherein the frame further comprises a boss extending away from a surface of the frame proximate the aperture.*

*17. The deflator of claim 15 wherein the aperture extends in a longitudinal direction with respect to the spike, and wherein the sleeve is further comprised of a resilient material for selectively deflecting in response to a deflection of the spike in a transverse direction.*

*18. The deflator of claim 15 further comprising a seat having a third diameter sized to receive a base end of the spike.*

*19. The deflator of claim 18 wherein the seat further comprises a floor positioned to orient a pointed end of the spike to extend away from a distal end of the seat.*

*20. The deflator of claim 18 wherein the seat further comprises a floor positioned to resist longitudinal movement in response to a force exerted on the spike.*

*21. The deflator of claim 15 wherein the spike further comprises a channel for conducting air longitudinally with respect to the spike.*

*22. The deflator of claim 21 wherein the channel further comprises a tube having an inner diameter sized to conduct air.*

*23. The deflator of claim 15 wherein the spike further comprises a spike wall fitted internally with an insert extending longitudinally along an inner surface of the spike wall.*

*24. The deflator of claim 23 wherein the insert is formed to have a size effective to strengthen the spike.*

*25. The deflator of claim 24 wherein the insert further comprises a member extending across the spike in a lateral direction for resisting buckling of the spike.*

*26. The deflator of claim 23 wherein the insert comprises a corrugated member for conducting air in a longitudinal direction.*

*27. The deflator of claim 23 wherein the insert is sized to support the spike with respect to the frame, and to release the spike upon engagement of the spike by a tire.*

*28. The deflator of claim 23 wherein the insert further comprises a foot positionable proximate a base end of the spike for supporting the spike against penetration into the frame in response to a force applied in a longitudinal direction.*

*29. The deflator of claim 23 wherein the insert further comprises a foot attached to one end thereof and securable to the seat for retaining the insert in the seat upon removal of the spike from the seat.*

*30. The deflator of claim 15 wherein the frame further comprises a plurality of base supports associated with a plurality of arms, a base support of the plurality of base supports being pivotably connected to an arm of the plurality of arms to render the frame selectively extendible by pivoting the base support with respect to the arm.*

*31. The deflator of claim 30 further comprising stops connected to the frame for positioning the base supports with respect to the arms.*

*32. The deflator of claim 30 further comprising a first stop connected to the base support for engaging a second stop connected to the arm for limiting pivoting of the base support in a first direction with respect to the arm, toward an extended position.*

*33. The deflator of claim 32 further comprising a first lifting ramp on the base support and a second lifting ramp on the arm for displacing the base support with respect to the arm upon pivoting of the base support in a second direction opposite the first direction toward a folded position.*

*34. The deflator of claim 33 wherein the first stop is formed to include the first lifting ramp, and the second stop is formed to include the second lifting ramp.*

*35. The deflator of claim 15 wherein the frame further comprises a lever connected to a base support for tilting the spike positioned in the base support toward a tire rolling over the lever.*

*36. The deflator of claim 15 wherein the frame further comprises a base support for supporting the spike, and having a lever connected at a proximal end to the base support to extend away therefrom to a standoff formed at a distal end for receiving a tire thereon, the standoff being sized to urge the base support away from the tire for withdrawing with the tire the spike from the base support as the tire moves away from the base support.*

*37. A deflator for tires the deflator comprising:*

*a frame for supporting a plurality of spikes on a surface, the frame comprising a plurality of base supports associated with a plurality of arms, a base support of the plurality of base supports being pivotably connected to an arm of the plurality of arms to render the frame selectively extendible by pivoting the base support with respect to the arm;*

*a spike of the plurality of spikes supported by the base support to extend away therefrom for penetrating a tire rolling over the base support;*

*a first stop connected to the base support;*

*a second stop connected to the arm to engage the first stop for limitinq pivoting of the base support in a first direction, with respect to the arm, toward an extended position.*

*38. The deflator of claim 37 further comprising a first lifting ramp on the base support and a second lifting ramp on the arm, the first lifting ramp and second lifting ramp being mutually engageable to displace the base support with respect to the arm upon pivoting of the base support in a second direction opposite the first direction and toward a folded position.*

*39. The deflator of claim 38 wherein the first stop is formed to include the first lifting ramp, and the second stop is formed to include the second lifting ramp.*

*40. A tire deflator for deflating a tire of a vehicle, the deflator comprising:*

*a frame supporting a plurality of spikes;*

*a spike of the plurality of spikes positioned at an angle effective to penetrate the tire, the spike having an opening extending longitudinally to a distal end thereof; and*

*an insert sized to fit the opening and to extend from the distal end, the insert comprising:*

*a first end sized to fit the opening,*

*a second end positioned to extend beyond the distal end to a point formed in a shape effective to penetrate into the tire,*

*a portion extending between the first end and the second end and comprising a material selected to have a strength effective to support the second end during said penetration.*

* * * * *

UNITED STATES PATENT AND TRADEMARK OFFICE

CERTIFICATE OF CORRECTION

PATENT NO. : RE 35,373

DATED : November 5, 1996

INVENTOR(S) : Donald Kilgrow & Melvin H. Pederson

It is certified that error appears in the above-identified patent and that said Letters Patent is hereby corrected as shown below:

In line 20 of the Abstract, please delete "fire" and insert therefor --tire--.

In line 21 of the Abstract, after "fitted" delete the "-" (punctuation hyphen).

In column 1, line 17, after the word "barricades", please add a --,-- (punctuation comma).

In column 1, line 26, please delete "invention" and insert therefor --inventors--.

In column 3, line 30, please delete "fight" and insert therefor --right--.

In column 3, line 37, please delete "fight" and insert therefor --right--.

In column 4, line 14, after the number "21c", please add --.-- (a punctuation period).

In column 4, line 50, after the word "tire", please add --28,--.

In column 6, line 33, after the number "8", please add --,-- (a punctuation comma).

In column 6, line 34, please delete "44)" and insert therefor --40--.

In column 6, line 64, please delete "ARM" and insert therefore --arm--.

In column 8, line 66, after the word "aperture", please add --,-- (punctuation comma).

UNITED STATES PATENT AND TRADEMARK OFFICE

CERTIFICATE OF CORRECTION

PATENT NO. : RE 35,373 Page 2 of 2

DATED : November 5, 1996

INVENTOR(S) : Donald Kilgrow , et al

It is certified that error appears in the above-identified patent and that said Letters Patent is hereby corrected as shown below:

In column 10, line 20, after the word "tires", please add --,-- (a punctuation comma).

Signed and Sealed this

Twenty-fifth Day of March, 1997

*Attest:*

Bruce Lehman

BRUCE LEHMAN

*Attesting Officer*

*Commissioner of Patents and Trademarks*